Sept. 20, 1971  C. G. P. OLDERSHAW  3,605,844
CORN DEBUTTING MACHINE AND METHOD

Filed Aug. 14, 1969  2 Sheets-Sheet 1

INVENTOR.
C.G. PETER OLDERSHAW

BY
Thomas V. Sullivan

ATTORNEY

Sept. 20, 1971          C. G. P. OLDERSHAW                3,605,844
                   CORN DEBUTTING MACHINE AND METHOD
Filed Aug. 14, 1969                                  2 Sheets-Sheet 2

INVENTOR.
C. G. PETER OLDERSHAW
BY
Thomas V. Sullivan
ATTORNEY

United States Patent Office 3,605,844
Patented Sept. 20, 1971

3,605,844
CORN DEBUTTING MACHINE AND METHOD
Charles G. Peter Oldershaw, Avon, N.Y., assignor to General Foods Corporation, White Plains, N.Y.
Filed Aug. 14, 1969, Ser. No. 850,108
Int. Cl. A23n *15/04*
U.S. Cl. 146—242
7 Claims

ABSTRACT OF THE DISCLOSURE

A machine for debutting corn including means for gauging the ears whereby minimum damage to the kernels and controlled depth of cut are obtained.

This invention relates to a corn debutting machine and method. More particularly, it relates to a machine for cutting and trimming the waste end or butt from ears of corn.

Commercially canned and frozen corn is presently husked by machine in two steps: first, the ear is debutted, i.e., trimmed at the stalk end, preferably near the first ring of kernels; then the debutted ear is husked by the gripping action of a pair of cooperating rollers. While this invention relates essentially to the first step, the machine accomplishes debutting in such a manner that the second step of husking may be accomplished with minimum damage to the kernels as well. By reducing kernel damage and by providing for a controlled depth of cut of butt from the stalk end of the corn, considerable economy in operation may be achieved and excessive trimming losses may be avoided.

An object of the present invention is to provide a corn debutting machine including high speed operation with minimum damage to the kernels as might be caused by crushing or bruising and uniformity of operation regardless of the length or diameter of the ear.

Another object of this invention is to provide a corn debutting machine having gauging means which function to limit the amount of longitudinal travel of the ear as it is moved with its larger diameter end forward toward the cutting means.

Another object of this invention is to provide a corn debutting machine having means for imparting lateral movement of the ear to the plane of the cutting means.

It is a still further object of this invention to provide a corn debutting machine whereby the depth of cut from the butt end may be carefully controlled without damaging the kernels.

Other objects and advantages of the invention will become apparent from the specification and claims herein and consideration of accompanying drawings which are to be taken in connection with the description.

Figure 1:
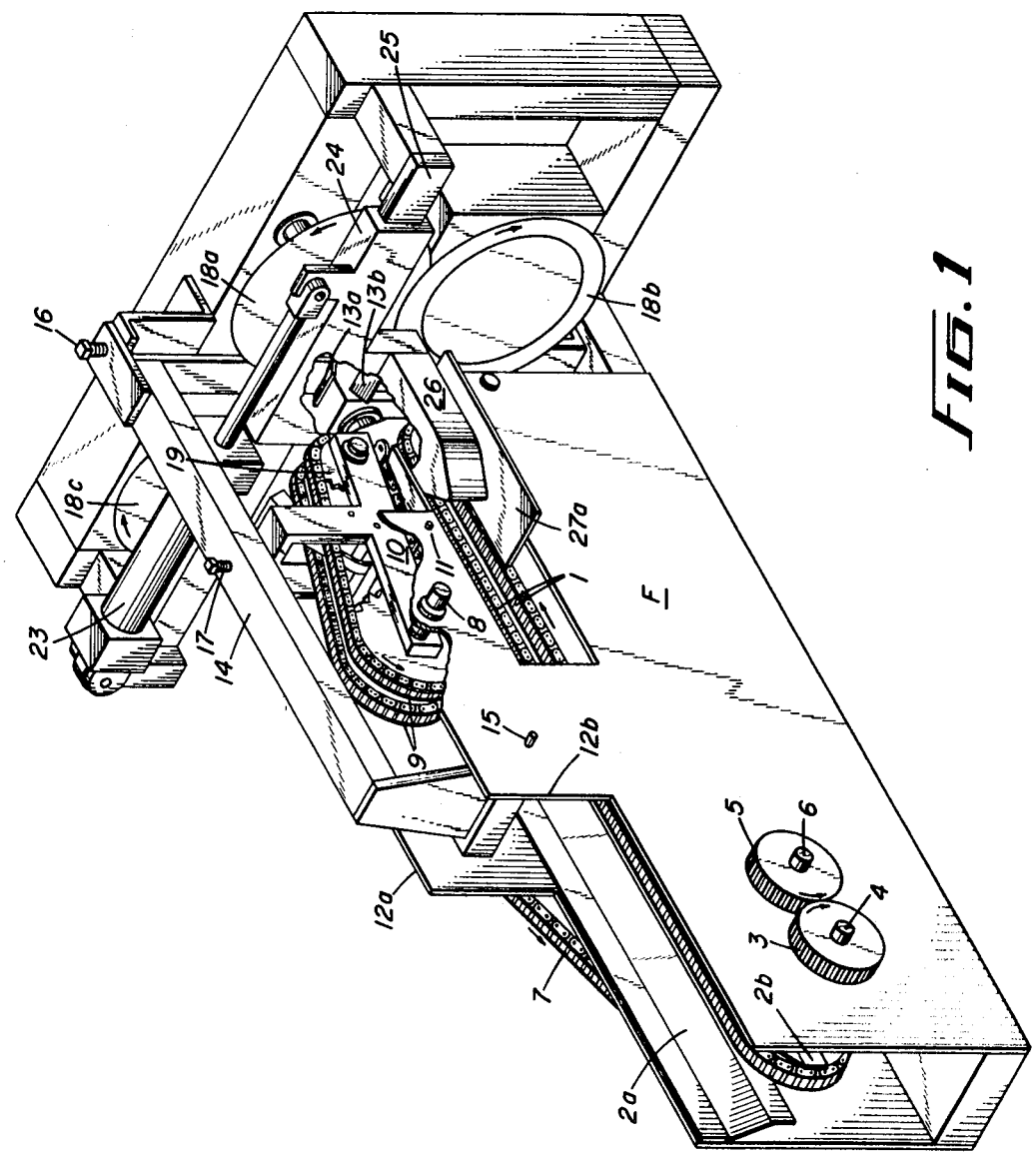
Figure 2:
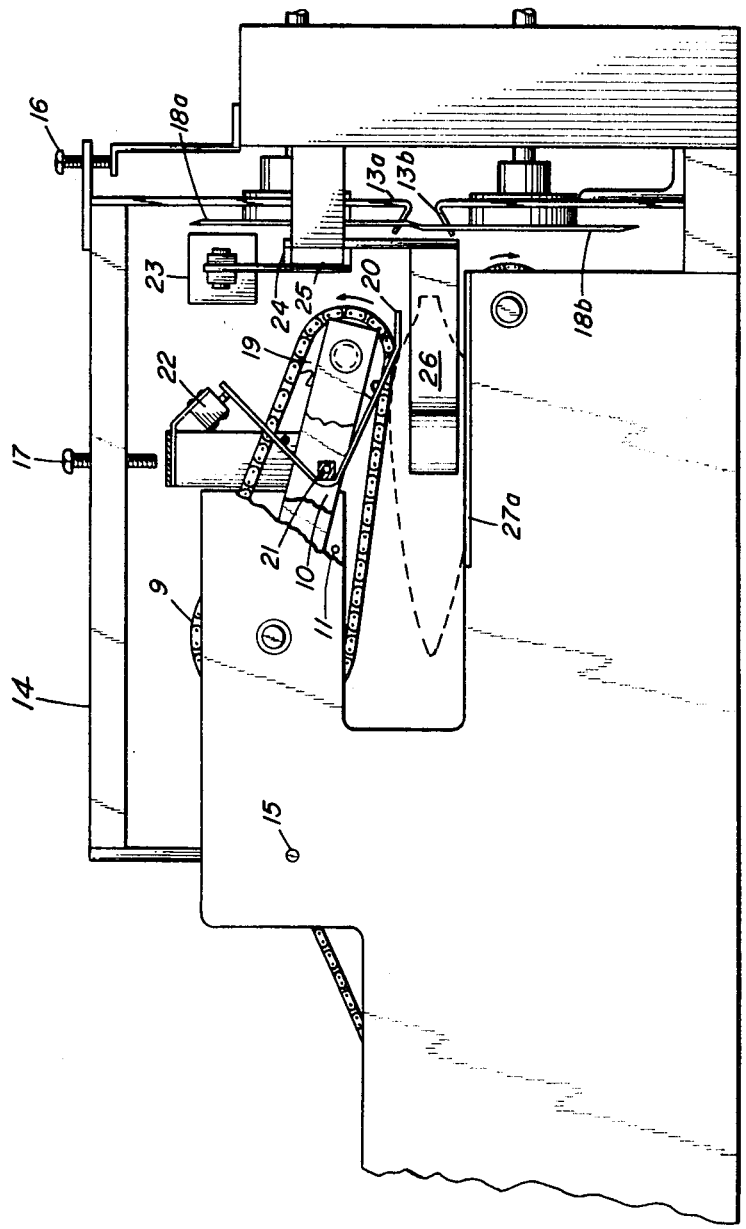

In the drawings—
FIG. 1 is a perspective view of a corn debutting machine embodied in the present invention.
FIG. 2 is a right side partial elevational view of the machine.

Referring to the drawings in detail, wherein similar reference characters designate corresponding parts throughout the several views, FIG. 1 is an overall view of the corn debutting machine, with the feed chain drive motor, the knife drive motor, the air control circuitry, and discharge chutes not shown. FIG. 2 is a partial side elevation showing the positioning of an ear of corn as it enters the gauging and cutting zones.

The ears of corn are delivered in succession from an orienting apparatus (not shown) by a narrow belt or chain conveyor (not shown) each with its longitudinal axis parallel to the line of travel, and oriented larger diameter or butt end first, onto double chain conveyor 1 in frame F. The corn is centered on the pair of chains by guides 2a and 2b during the initial part of passage through the machine. Spur gear 3, mounted on the shaft 4 of the conveyor, engages spur gear 5 mounted on an auxiliary shaft 6. Through drive chain 7 and appropriate chain sprockets (out of view) shaft 8 is rotated in opposite direction to that of conveyor shaft 4. This shaft 8 drives a double chain overhead conveyor 9, whose frame 10 is journalled on shaft 8 so that its free end may rotate in a vertical plane and thereby change the vertical clearance between the lower and upper pairs of conveyor chains. Both chain conveyors move at the same linear speed. The pivoted frame 10 normally rests on pin 11 held in side frame members 12a and 12b.

As an ear advances to the position indicated by the dotted outline in FIG. 2, the upper conveyor is lifted off pin 11, and, pressing down on the ear, aids in driving the ear positively toward the gauge stops 13a and 13b. Whereas the lower gauge stop 13b is fixed, the upper one, 13a, is mounted on arm 14 which is pivoted about pin 15. The adjusting screw 16 controls the at-rest position of the upper gauge stop 13, while the adjusting screw 17 controls the elevation at which the lifting of the overhead conveyor by a large ear will start to raise the upper gauge stop. The gap between the two gauge stops will therefore be automatically opened by ears above a selected diameter by an amount proportional to their diameters. Generally, this adjustment of the gauge stop opening will tend to stop the ear so that the cutting plane of the knives 18a and 18b or 18c and 18d (not shown) will be near the first rings of kernels.

As seen in FIG. 2, the corn, in passing under the sprocket 19 of the upper conveyor will deflect the lever 20, pivoted at pin 21 on frame 10, thereby actuating air pilot valve 22. This pilot valve, through appropriate air circuitry causes the air cylinder 23 to move the slide 24 from its extreme right to its extreme left position on slide bar 25, or vice versa. The push bar 26 mounted on the slide 24 thereby pushes the ear laterally over one of the two fixed surfaces 27a and 27b (not shown) into the bite of either the left or right pair of cooperating motor driven circular knives 18a and 18b or 18c and 18d (not shown) which are so located in relation to the gauge stops, as seen in FIG. 2, that they cut off the butt end of the ear near the first ring of kernels. Whereas the ear of corn actuates the air pilot valve 22 as it first contacts lever 20, its speed carries it into contact with the gauge stops 13a and 13b before the air cylinder 23 acts to move it laterally into the bite of the knives.

It can be seen that the push bar laterally moves an ear of corn into contact with one of the pairs of knives with each stroke thereby eliminating the need for a time-consuming return stroke. This arrangement thus permits the ears to be fed into the debutting machine in rapid succession.

The butt ends severed from the ear are conducted away from the cutting zones by chutes (not shown).

As the debutted ears drop away from the knives they may be directed by chutes (not shown) to a conveyor belt, all oriented in the same direction. This feature maintains the uniform orientation of the corn, which reduces the hand labor required in subsequent processing steps.

Thus, the debutting method in this machine involves two distinct motions of the ear:
(a) Longitudinal travel, butt end first, until the ear is stopped by the adjustable gauge stops 13a and 13b.
(b) Lateral travel into the bite of the pairs of cooperating knives 18a and 18b or 18c and 18d.

These motions are imparted by mechanisms that apply their forces over a relatively large area of the ear. Consequently, the mechanical pressures applied to the ear are not great enough to crush the kernels.

Referring again to FIGS. 1 and 2, the ear rides on the surface of the double conveying chain 1 until its upper surface is engaged by the lower side of the similar double chain of the pivoted hold-down mechanism. The weights of this mechanism together with that of the gauge adjusting mechanism pivoted at 15 are sufficient only to ensure that the cooperative action of the upper and lower chains drives the ear into full contact with the two gauge stops 13a and 13b. In contrast to the debutting mechanism on certain conventional husking machines, in which the ear must be moved longitudinally into a gauge stop while it is simultaneously being advanced laterally by means of a push bar, the mechanisms embodied in the corn debutting machine of this invention simply make more positive the established forward motion of the ear toward the gauge stops. Thus, the pressure from the two chains is sufficiently light that when the ear rests momentarily at the gauge stops the chains slide over the surface of the ear without damaging the kernels.

The lateral movement of the ear into the bite of the cooperating motor driven circular knives 18a and 18b or 18c and 18d (not shown) is accomplished by the reciprocating push bar 26. Here again, the force is transmitted to the ear over a relatively large area and the resistance to the lateral motion of the ear from the chains that are sliding over the ear surface is relatively light. The fact that this configuration allows use of a flat pushing surface circumvents the necessity of employing gripping mechanisms which would damage the kernels.

From the foregoing description, it may be seen that a corn debutting machine is provided which is characterized by simplicity and speed in operation while at the same time damage to the kernels is minimized and controlled depth of cutting from the butt end is obtained. Thus, as the machine receives the ears, butt end first from an orienting apparatus, each ear is positively driven against gauge stops by a simple mechanism which permits automatic adjustment for each ear without impeding travel of the ear toward the stops. Moreover, during longitudinal and lateral travel throuhg the machine, the ears are not damaged by gripping devices nor by intense pressure.

Although the drawings and specification set forth preferred embodiments of the invention, it is apparent that such are by way of example only and that numerous changes in details in construction can be providing the same do not depart from the spirit and scope of the invention as defined in the appended claims.

What I claim is:

1. A corn debutting machine comprising in combination:
    means for moving an ear of corn, its larger diameter end forward, in a longitudinal direction;
    means for moving said ear of corn in a lateral direction;
    cutting means;
    gauging means engaged with said longitudinally directing moving means for adjusting as determined by the size and shape of the ear the depth of cut by the cutting means from the butt of the ear.

2. A corn debutting machine as in claim 1 in which said gauging means are pivotally connected with said longitudinally directing moving means.

3. A corn debutting machine as in claim 2 further comprising
    limiting gauge stops whereby the longitudinal movement of said ear of corn is terminated.

4. A corn debutting machine as in claim 3 in which said means for moving said ear of corn in a longitudinal direction comprises upper and lower endless chain conveyors.

5. A corn debutting machine as in claim 4 in which said cutting means comprise two pairs of coacting rotary knives.

6. A corn debutting machine comprising in combination:
    cutting means;
    gauging means to position an ear of corn, with its larger diameter end forward, in relation to said cutting means;
    lower and upper conveyor means adapted to receive said ear of corn therebetween and to propel said ear of corn longitudinally into engagement with gauge stops; and
    a push bar adapted to transfer said ear of corn from the lower and upper conveyor means laterally into said cutting means.

7. A method for debutting corn comprising:
    moving an ear of corn with its larger diameter end forward in a longitudinal direction;
    causing said ear to engage an adjustable gauging device whereby the amount of butt to be removed may be controlled;
    and transferring said ear while so engaged in the gauging device laterally into the path of rotating cutting knives.

References Cited

UNITED STATES PATENTS

| | | | |
|---|---|---|---|
| 1,484,373 | 2/1924 | Hoy | 146—84 |
| 1,561,092 | 10/1925 | Leister | 146—84 |
| 1,763,173 | 6/1930 | Morral et al. | 146—84 |
| 1,864,663 | 6/1932 | Morral | 146—84 |
| 3,349,822 | 10/1967 | Rauth | 146—84X |
| 3,451,397 | 6/1969 | Rauth | 146—84X |

WILLIAM S. LAWSON, Primary Examiner

U.S. Cl. X.R.

146—4, 84